(12) United States Patent
Yeh et al.

(10) Patent No.: US 9,823,554 B2
(45) Date of Patent: Nov. 21, 2017

(54) PROJECTOR

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chin-Wen Yeh, New Taipei (TW); Zhi-Jian Peng, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 34 days.

(21) Appl. No.: 14/814,834

(22) Filed: Jul. 31, 2015

(65) Prior Publication Data
US 2016/0363844 A1    Dec. 15, 2016

(30) Foreign Application Priority Data
Jun. 12, 2015  (CN) .......................... 2015 1 0321634

(51) Int. Cl.
*G03B 21/16*   (2006.01)
*H04N 9/31*    (2006.01)
*G03B 21/20*   (2006.01)

(52) U.S. Cl.
CPC ......... *G03B 21/16* (2013.01); *G03B 21/2093* (2013.01); *H04N 9/3144* (2013.01)

(58) Field of Classification Search
CPC ...... G03B 21/16; G03B 21/14; G03B 21/145; H04N 9/3144; H04N 9/3141
USPC ......................................... 353/60, 61, 57, 58
See application file for complete search history.

(56) References Cited

U.S. PATENT DOCUMENTS

| 2008/0284987 A1* | 11/2008 | Yonezawa | ............ H04N 9/3185 353/70 |
| 2009/0027627 A1* | 1/2009 | Noda | ..................... G03B 21/16 353/61 |
| 2011/0279784 A1* | 11/2011 | Okoshi | ................ G03B 21/145 353/52 |

* cited by examiner

*Primary Examiner* — Ryan Howard
(74) *Attorney, Agent, or Firm* — Steven Reiss

(57) ABSTRACT

A projector includes a base and a cover configured to be attached on the base. The base is equipped with a cooling fan, a light module and a cooling member. An air inlet and an air outlet are located on the two sides of the light module. The cooling member is aligned with the air outlet and close to the cooling fan. The cooling member guides the airflow to flow to the cooling fan. The air inlet, the air outlet, the cooling member, and the cooling fan define an air path, and the airflow is guided out of the projector under an action of the cooling fan.

12 Claims, 4 Drawing Sheets

PROJECTOR

CROSS-REFERENCE TO RELATED APPLICATIONS

This application claims priority to Chinese Patent Application No. 201510321634.1 filed on Jun. 12, 2015, the contents of which are incorporated by reference herein.

FIELD

The subject matter herein generally relates to electronic devices, and more particularly to a projector.

BACKGROUND

Projectors have become popular with those who give presentations. A projector can be configured to be coupled to another electronic device and display an image based on data received from the other electronic device. The main heat source of the projector is from the light used in projecting the image.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
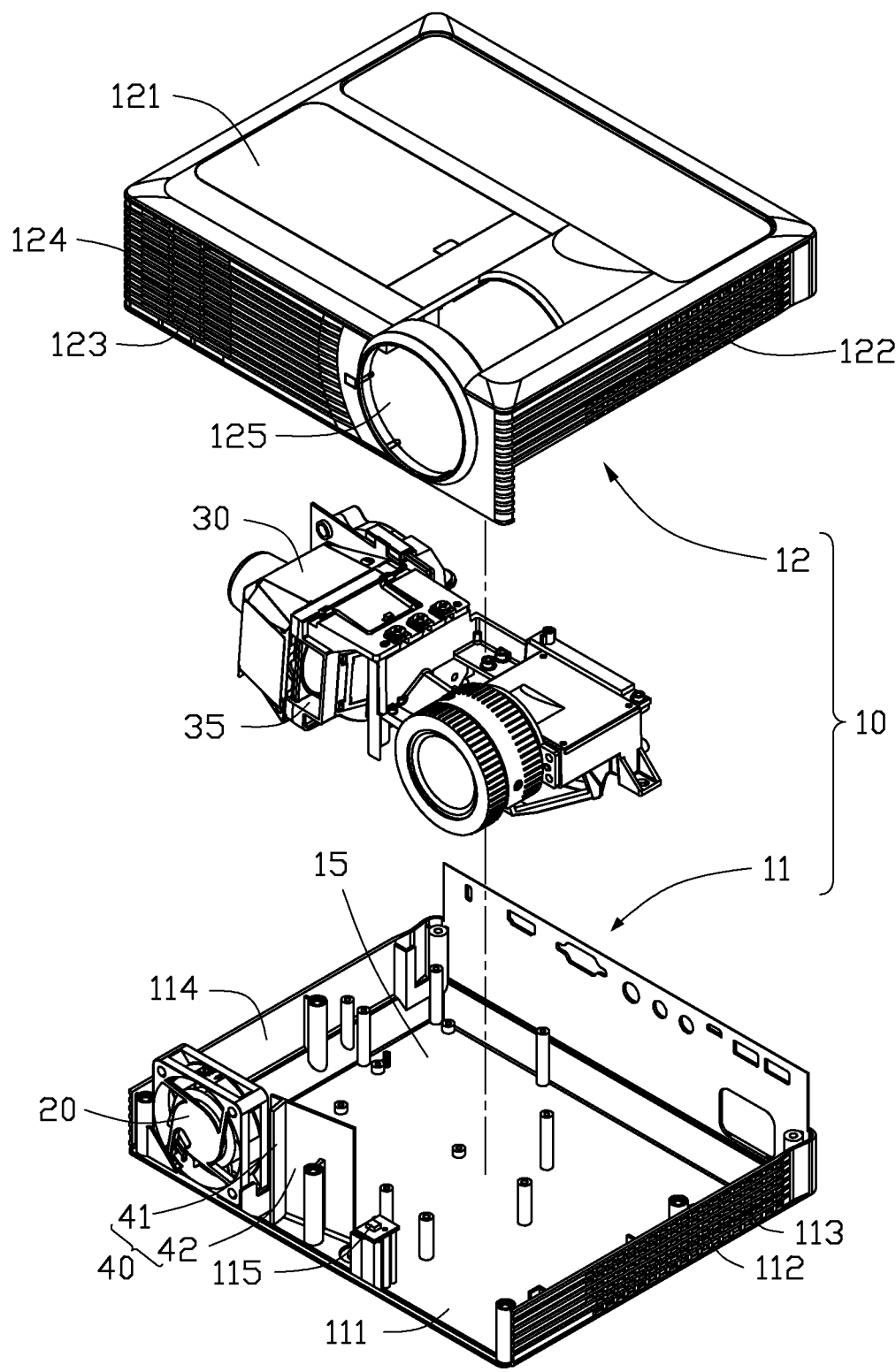
FIG. 1 is an isometric, exploded view of an embodiment of a projector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates one embodiment of a projector 100. The projector 100 includes a shell 10, a cooling fan 20 configured to be coupled to the shell 10, a light module 30 configured to be coupled to the shell 10 and a cooling member 40.

Figure 2:
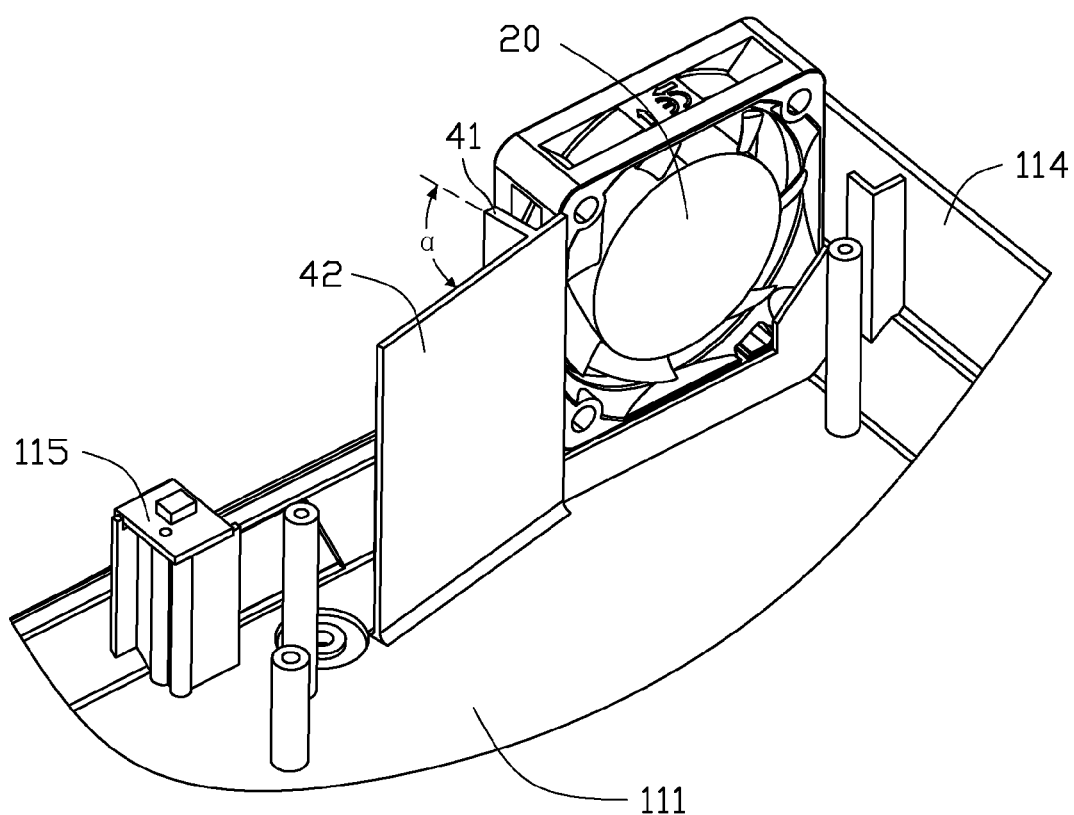
FIG. 2 is an isometric, exploded view of a signal receiver, a cooling fan, and a cooling member of FIG. 1.

FIGS. 1 and 2 illustrate that the shell 10 includes a base 11 and a cover 12 configured to be attached on the base 11. The base 11 and the cover 12 cooperatively define a receiving space 15 configured to receive the cooling fan 20, the light module 30 and the cooling member 40.

The base 11 includes a bottom 111, a first sidewall 112 and a second sidewall 114. The first sidewall 112 and the second sidewall 114 are respectively located on opposite edges of the bottom 111. The first sidewall 112 is substantially parallel to the second sidewall 114. The first sidewall 112 defines a plurality of air vents 113 configured to allow the airflow to pass. One end of the bottom 111 is equipped with a signal receiver 115. The signal receiver 115 is configured to receive a signal from a remote control device (not shown) of the projector 100. In at least one embodiment, the signal receiver 115 is an infrared receiver.

The cover 12 includes a top plate 121, a first side plate 122, and a second side plate 124. The first side plate 122 and the second side plate 124 are respectively located on the adjacent edge of the top plate 121. The first side plate 122 and the second side plate 124 define a plurality of air vents 123. The airflow is configured to pass through the air vents 123 of the first side plate 122 to enter into the projector 100 and pass through the air vents 123 of the second side plate 124 to disperse outside the projector 100. The second side plate 124 further defines a through hole 125 configured to allow the light to pass.

The cooling fan 20 is secured on the one end of the bottom 111 and is closely to the signal receiver 115. The cooling fan 20 is configured to drive the airflow out of the projector 100 via the air vents 123 of the second side plate 124. An air inlet (not show) and an air outlet 35 are respectively located on the two sides of the light module 30. The airflow passes through the air inlet to enter into the light module 30 and disperses outside the light module 30 via the air outlet 35 dissipating the heat of the light module 30.

The cooling member 40 is substantially a cuboid. The cooling member 40 is secured on the one end of the bottom 111 and is close to the signal receiver 115. The cooling member 40 includes a positioning plate 41 and a guiding plate 42. The positioning plate 41 is substantially parallel to the first sidewall 112 and the second sidewall 114. The positioning plate 41 and the guiding plate 42 define an obtuse angle α therebetween. The cooling fan 20 is installed between the second sidewall 114 and the positioning plate 41. A distance between the cooling fan 40 and the second sidewall 114 is substantially equal to a distance between the cooling fan 40 and the positioning plate 41. In at least one embodiment, the cooling member 40 is integrated with the bottom 111. The base 11 and the cooling member 40 are made of heat conduction material configured to cool quickly. In at least one embodiment, the base 11 and the cooling member 40 is made of metal material.

Figure 3:
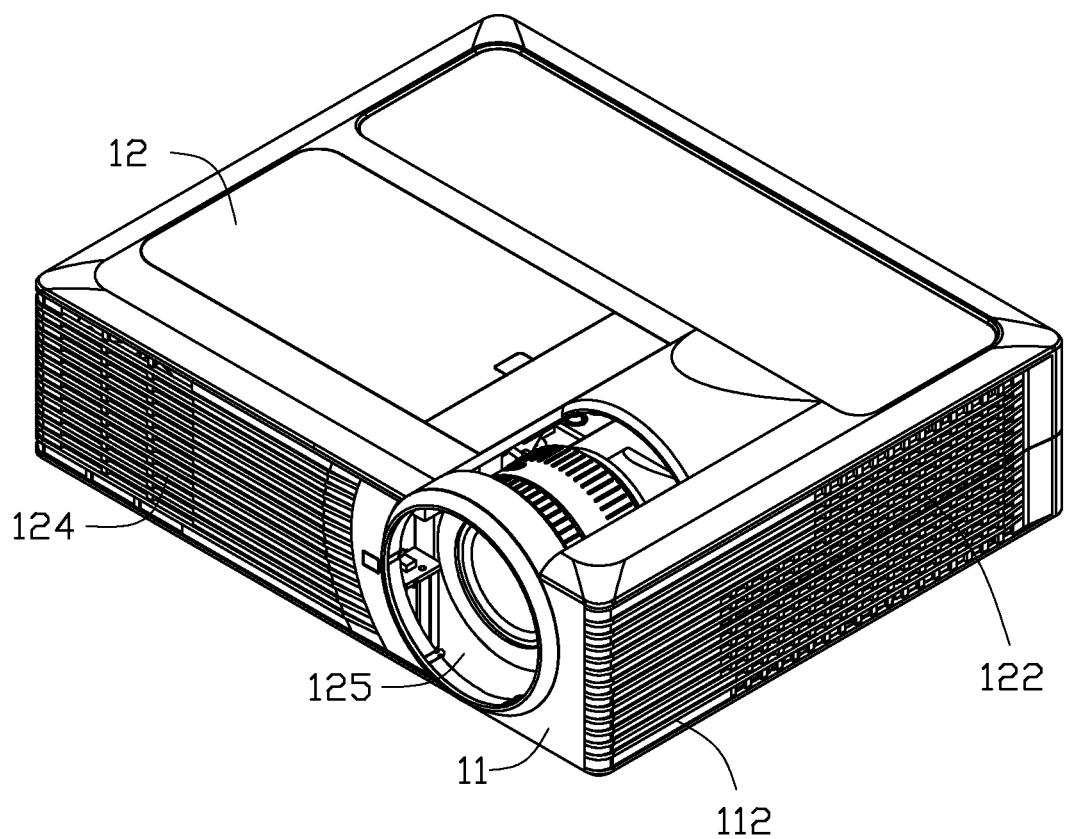
FIG. 3 is an isometric, assembled view of the projector of FIG. 1.

When the projector is assembled, as illustrated in FIG. 3, the signal receiver 115, the cooling fan 20 and the light module 30 are secured on the bottom 111. The signal receiver 115 and the air outlet 35 of the light module 30 are located on the two sides of the guiding plate 42. The air outlet 35 is aligned with the cooling member 40. The cover 12 is secured on the bottom 11. The first side plate 122 is closely attached on the first sidewall 112. The light of the light module 30 can pass through the through hole 125.

Figure 4:
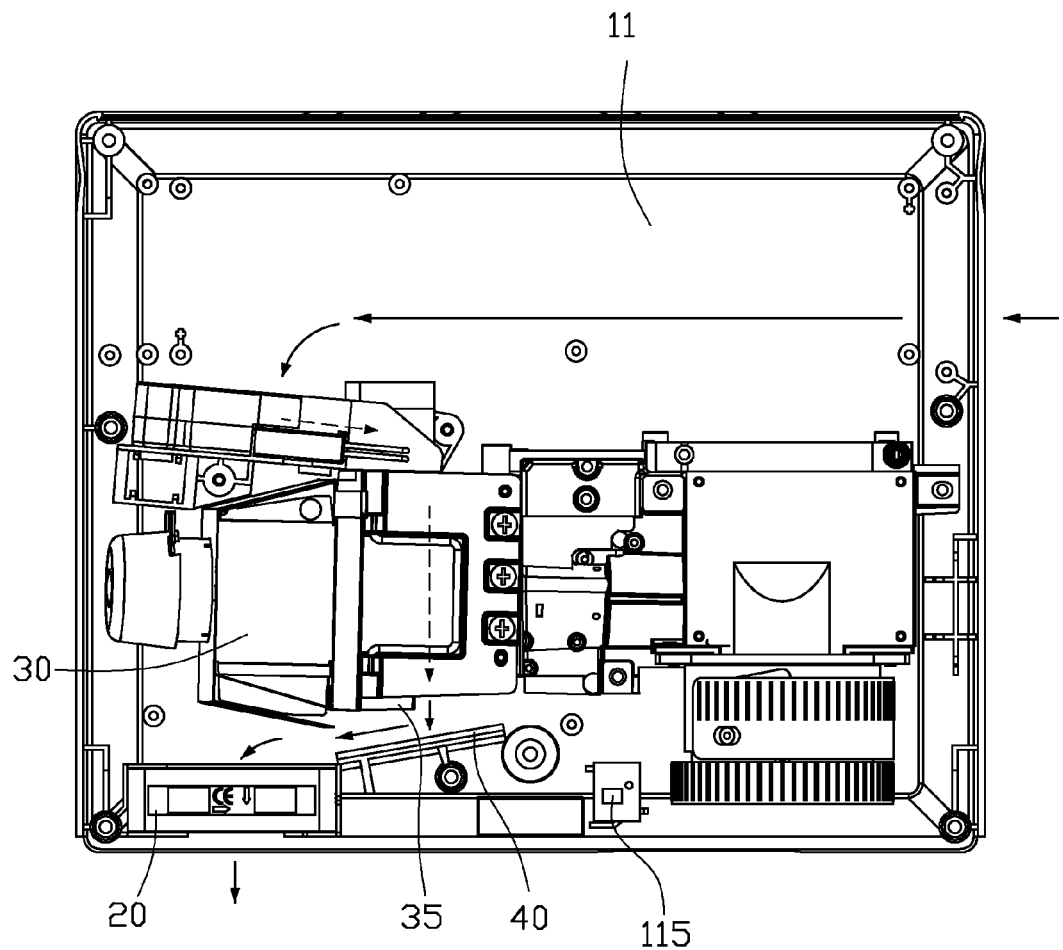
FIG. 4 is similar to FIG. 3, but a cover is not shown.

FIG. 4 illustrates when the projector 100 is in operation, the airflow passes through the air vents 113 of the first sidewall 112 and the air vents 123 of the first side plate 122 to enter into the projector 100. Then, the airflow passes through the air inlet to enter into the light module 30, and passes through the air outlet 35 to disperse outside the light module 30 to dissipate the heat of the light module 30. The cooling member 40 guides the airflow to the cooling fan 20 to prevent the airflow from flowing to the signal receiver 115. The cooling fan 20 drives the airflow to disperse outside the projector 100 through the air vents 123 of the second side plate 124, thereby dissipating the heat of the light module 30. The cooling member 40 can absorb the heat of the airflow and transfer the heat to the base 11 to dissipate the heat.

The embodiments shown and described above are only examples. Many details are often found in the art such as the other features of a projector. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A projector comprising:
   a base comprising a bottom, a first sidewall and a second sidewall;
   a cooling fan configured to be coupled to the base;
   a light module configured to be coupled to the base defining an air inlet and an air outlet; and
   a cooling member secured on the base, comprising a positioning plate and a guiding plate, an obtuse angle α is defined between the positioning plate and the guiding plate;
   wherein the cooling fan is secured on the bottom and located between the second sidewall and the positioning plate, the cooling member is aligned with the air outlet and closed to the cooling fan; the cooling member guides airflow to flow to the cooling fan; the air inlet; the air outlet, the cooling member, and the cooling fan define an air path, and the airflow is guided out of the projector under an action of the cooling fan, the first sidewall and the second sidewall are respectively located on the opposite edges of the bottom, the first sidewall is parallel to the second sidewall, the first sidewall defines a plurality of air vents configured to allow the airflow passing through, and the positioning plate is parallel to the first sidewall and the second sidewall.

2. The projector of claim 1, wherein the base comprises a bottom, the cooling member is integrated with the bottom, the cooling member and the base are made of heat conduction material.

3. The projector of claim 1, wherein the bottom is equipped with a signal receiver, and the signal receiver is configured to receive a signal from a remote control device of the projector.

4. The projector of claim 3, wherein the signal receiver and the air outlet of the light module are respectively located on the two sides of the guiding plate, and the guiding plate is configured to prevent the airflow flowing to the signal receiver.

5. The projector of claim 1, wherein the projector comprises a cover configured to be attached on the base, the cover comprises a first side plate and a second side plate, the first side plate and the second side plate define a plurality of air vents.

6. The projector of claim 5, wherein the second side plate defines a through hole, the through hole is configured to allow the light of the light module to pass through.

7. A projector comprising:
   a base comprised a bottom, a first sidewall defining a plurality of first air vents, and a second sidewall;
   a cooling fan configured to be coupled to the base;
   a light module defining an air inlet and an air outlet;
   a cover configured to be attached on the base, the cover comprising a first side plate defining a plurality of second air vents and a second side plate defining a plurality of third air vents; and
   a cooling member secured on the base, comprises a positioning plate and a guiding plate, an obtuse angle α is defined between the positioning plate and the guiding plate;
   wherein the cooling fan is secured on the bottom and located between the second sidewall and the positioning plate, the cooling member is aligned with air outlet and close to the cooling fan, the airflow passes through the first air vents and the second air vents to enter into the projector, the cooling member guides the airflow to flow to the cooling fan, an air path is defined by the air inlet, the air outlet, the cooling member, and the cooling fan, and the airflow is guided out of the projector from the third air vents under an action of the cooling fan, the first sidewall and the second sidewall are respectively located on the opposite edges of the bottom, the first sidewall is parallel to the second sidewall, the first sidewall defines a plurality of air vents configured to allow the airflow passing through, and the positioning plate is parallel to the first sidewall and the second sidewall.

8. The projector of claim 7, wherein the base further comprises a bottom, the cooling member is integrated with the bottom, the cooling member and the base are made of heat conduction material.

9. The projector of claim 7, wherein the bottom is equipped with a signal receiver, and the signal receiver is configured to receive a signal from a remote control device of the projector.

10. The projector of claim 9, wherein the signal receiver and the air outlet of the light module are respectively located on the two sides of the guiding plate, and the guiding plate is configured to prevent the airflow flowing to the signal receiver.

11. The projector of claim 7, wherein the cover further comprises a top plate, the first side plate and the second side are respectively located on the adjacent edge of the top plate.

12. The projector of claim 11, wherein the second side plate defines a through hole, the through hole is configured to allow the light of the light module passing through.

* * * * *